(12) United States Patent
Grinbergs et al.

(10) Patent No.: US 8,235,093 B2
(45) Date of Patent: Aug. 7, 2012

(54) FLAT PLATE HEAT AND MOISTURE EXCHANGER

(75) Inventors: Peter Karl Grinbergs, Dorchester (CA); William Kwan, London (CA)

(73) Assignee: Nutech R. Holdings Inc., London, Ontario (CA)

( * ) Notice: Subject to any disclaimer, the term of this patent is extended or adjusted under 35 U.S.C. 154(b) by 966 days.

(21) Appl. No.: 12/142,054

(22) Filed: Jun. 19, 2008

(65) Prior Publication Data
US 2009/0314480 A1 Dec. 24, 2009

(51) Int. Cl.
*F23L 15/02* (2006.01)
(52) U.S. Cl. .................. 165/8; 165/4; 165/165; 165/166
(58) Field of Classification Search .................. 165/4, 5, 165/6, 7, 8, 9, 165, 166
See application file for complete search history.

(56) References Cited

U.S. PATENT DOCUMENTS

| | | | |
|---|---|---|---|
| 4,111,257 A | * | 9/1978 | Wiegard ............................ 165/9 |
| 5,617,913 A | * | 4/1997 | DeGregoria et al. ............. 165/4 |
| 5,785,117 A | * | 7/1998 | Grinbergs ...................... 165/165 |
| 6,413,298 B1 | | 7/2002 | Whek |
| 6,684,943 B2 | | 2/2004 | Dobbs et al. |

OTHER PUBLICATIONS

Energy Recovery Ventilation (ERV), Renewaire Web Site; www.renewaire.com; Internet 2008.
Energy Recovery Ventilator (ERV), Venmar Web Site; http://www.venmar.ca/ERVCorepage.aspx; Internet 2008.

\* cited by examiner

*Primary Examiner* — Ljiljana Ciric
(74) *Attorney, Agent, or Firm* — Tutunjian & Bitetto, P.C.

(57) ABSTRACT

This invention relates in general to air exchange systems and, in particular, to an improved energy recovery ventilator, a cross flow plate core associated therewith and a method of conditioning air for a building. In one aspect, the invention provides a cross flow plate core comprising: a left hand wafer comprising a left hand spacer with a first of a plurality of membranes bonded thereto, the left hand spacer comprising a plurality of parallel curvilinear rails which form channels for receiving a first stream of air; and a right hand wafer comprising a right hand spacer with a second of the plurality of membranes bonded thereto, the right hand spacer comprising a plurality of parallel curvilinear rails which form channels for receiving a second stream of air, wherein the left hand spacer of the left hand wafer is bonded to the top of the membrane of the right hand wafer.

12 Claims, 8 Drawing Sheets

(PRIOR ART)

FLAT PLATE HEAT AND MOISTURE EXCHANGER

BACKGROUND OF THE INVENTION

1. Field of the Invention

This invention relates in general to air exchange systems and, in particular, to an improved energy recovery ventilator (ERV), a cross flow plate core associated therewith and a method of conditioning air for a building.

2. Description of the Prior Art

Modern construction of commercial or residential buildings focuses on energy efficient building techniques which create airtight structures to minimize, in particular, heat loss in the winter and to reduce air conditioner use in the summer. However, unless properly ventilated, an airtight home can seal in indoor air pollutants and/or moisture. Contaminants such as formaldehyde, volatile organic compounds, and radon can accumulate in poorly ventilated homes, causing health problems. Excess moisture in a home can generate high humidity levels which can lead to mold growth and structural damage. Heating, ventilation and air conditioning (HVAC) systems in modern home construction include a furnace or similar device for heating in the winter along with an air conditioning device for cooling in the winter. Preferably, an integrated ventilation system is also included in new home construction to reduce the load on the heating and cooling components of the HVAC system.

With respect to the ventilation system, organizations such as the American Society of Heating, Refrigerating and Air-Conditioning Engineers (ASHRAE) suggest that an indoor living area should be ventilated at a rate of 0.35 air changes per hour or 15 cubic feet per person per minute, whichever is greater. There are three basic ventilation strategies to exchange indoor air with outdoor air:

(a) Natural ventilation which provides uncontrolled air movement into a home through cracks, small holes, and vents, such as windows and doors. In a modern airtight home natural ventilation is limited;

(b) Whole-structure ventilation which provides controlled air movement using one or more fans and duct systems. Such systems are particularly useful in airtight homes; and (c) Spot ventilation which provides controlled air movement using localized exhaust fans to quickly remove pollutants and moisture at their source.

Whole-structure ventilation systems provide controlled, uniform ventilation throughout a building or home. These systems use one or more fans and duct systems to exhaust stale air and/or supply fresh air to the house. There are four types of systems:

(a) Exhaust ventilation systems which force inside air out of a home;

(b) Supply ventilation systems which force outside air into the home;

(c) Balanced ventilation systems which force equal amounts quantities of air into and out of the home; and (d) Energy recovery ventilation systems which transfer heat and/or moisture from incoming or outgoing air to minimize energy loss There are two types of ERV systems: heat-recovery ventilators (HRV) and energy-recovery (or enthalpy-recovery) ventilators (ERV). Both types include a heat exchanger, one or more fans to push air through the heat exchanger, and some controls. The main difference between a heat-recovery and an energy-recovery ventilator is the way the exchanger works with respect to the transfer of either sensible heat or total latent heat energy. A heat-recovery ventilator is a sensible device which will result in a change of the air flow temperature only, while an energy-recovery ventilator is a total enthalpic device which results in a change of both the temperature and humidity within the air flow. In winter, an energy-recovery ventilator transfers some of the moisture from the exhaust air to the usually less humid incoming winter air, so that the humidity of the building air stays more constant. This also keeps the heat exchanger core warmer, minimizing problems with freezing. In the summer, an energy-recovery ventilator also helps to control humidity in the house by transferring some of the water vapor in the incoming air to the theoretically drier air that's leaving the house. In conjunction with an air conditioner, an energy-recovery ventilator generally offers better humidity control than a heat-recovery system. Most energy recovery ventilation systems can recover about 70%-80% of the energy in the exiting air and deliver that energy to the incoming air. Generally speaking, energy-recovery ventilators are most cost effective in climates with extreme winters or summers, and where fuel costs are high.

Figure 1A:
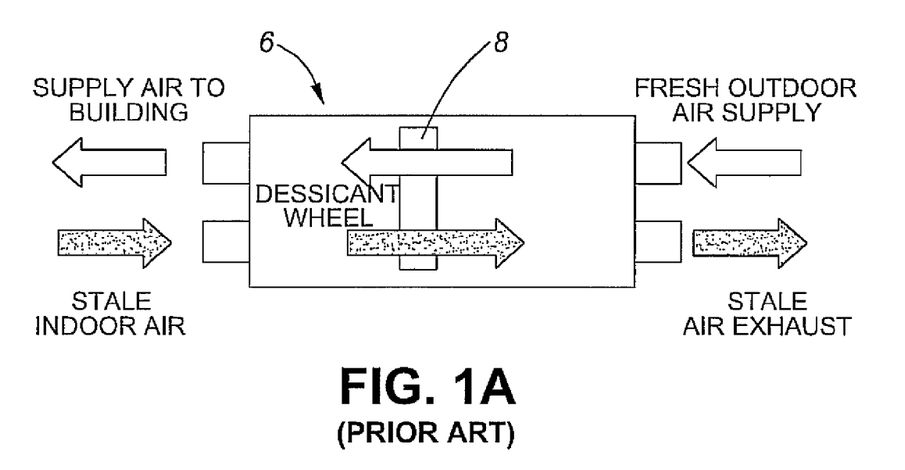
FIG. 1A depicts a prior art air exchanger with a rotary wheel core.
Figure 1B:
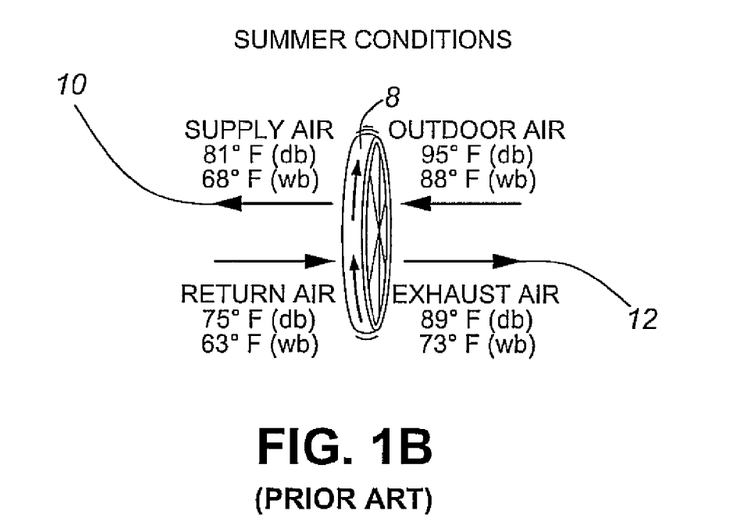
FIG. 1B depicts the rotary wheel core of the air exchanger of FIG. 1.

The key to an ERV system is the core which serves to exchange the heat/moisture between the incoming and outgoing air flows. There are two types of cores used in total enthaplic air exchangers: (a) Rotary wheel cores; and (b) Cross flow plate cores. With respect to (a), FIGS. 1A and 1B depicts a typical configuration of an air exchanger 6 with a rotary wheel core 8. Rotary wheel core 8 is filled with an air permeable material which provides a large surface area. The surface area is the medium for the sensible heat transfer. As rotary wheel core 8 rotates between the supply and exhaust air streams 10, 12 it picks up heat energy and releases it into the colder air stream. The driving force behind the heat exchange is the difference in temperatures between supply and exhaust air streams 10, 12, referred to as the thermal gradient. Typical media used in rotary wheel core 8 consist of polymer, aluminum, and synthetic fiber. The enthalpy exchange is accomplished through the use of desiccants. Desiccants transfer moisture through the process of absorption which is primarily driven by the difference in the partial pressure of vapor within the opposing air-streams. Typical desiccants consist of Silica Gel, and molecular sieves (to limit cross contamination). As shown in FIG. 1B which reflects summer conditions, the dry bulb (db) and wet bulb (wb) temperatures are both altered as air is passed through rotary wheel 8 e.g. both heat and moisture are removed from supply air stream 10.

Figure 2A:
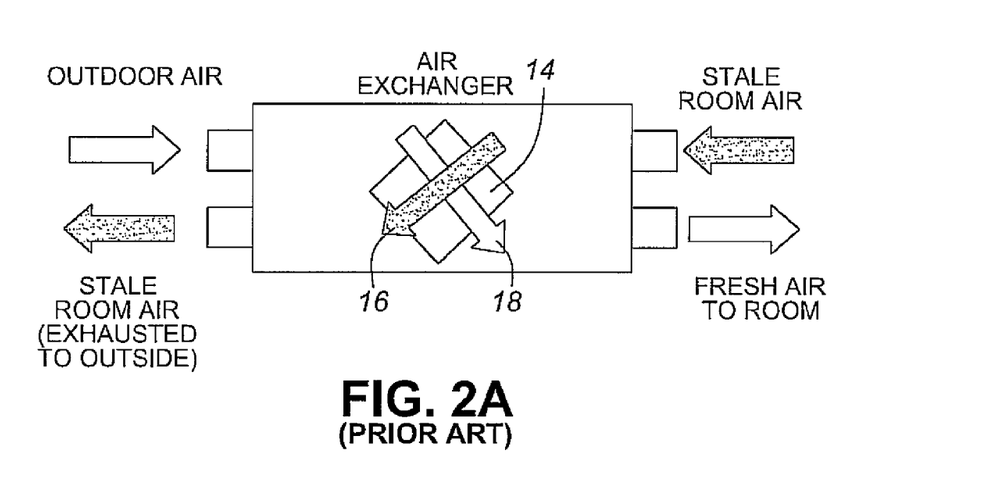
FIG. 2A depicts an energy recovery ventilator (ERV) with a cross flow plate core.
Figure 2B:
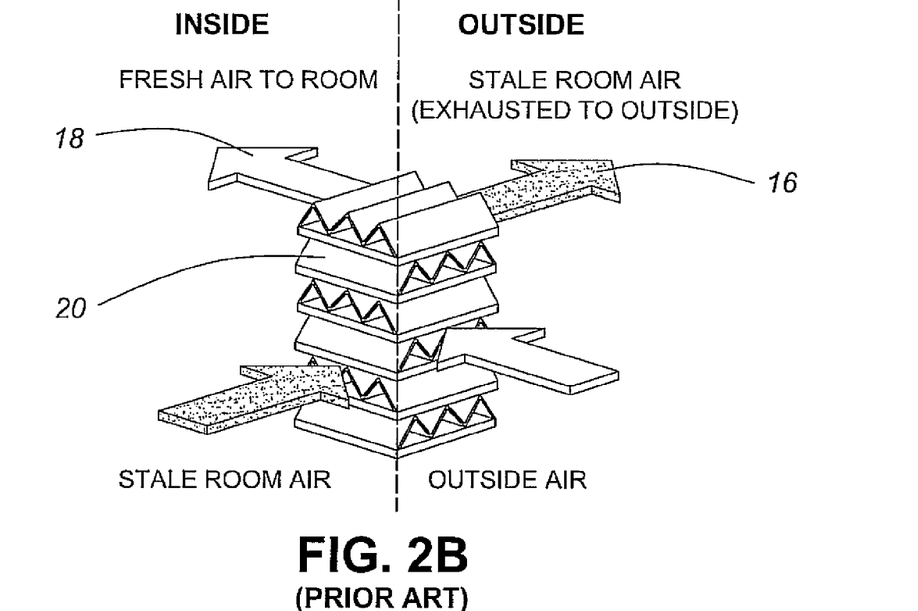
FIG. 2B depicts a prior art cross flow plate core used in the ERV of FIG. 2A.

With respect to (b), a cross-plate core arrangement 14 is depicted in FIG. 2A. Notably, air flows 16, 18 cross in the core and exchange heat/moisture. As will be understood in the art, the air flows do not physically interact, since the core consists of alternating layers of plates that are separated and sealed. FIG. 2B depicts a proprietary core structure offered by RenewAire highlighting how fresh and stale air flow streams 16, 18 are able to avoid coming in physical contact, yet are able to transfer heat/moisture through the configuration and type of membrane 20 which separates the air flows. The membrane 20 is typically treated paper or polyester fiber. As described in U.S. Pat. No. 6,413,298 issued Jul. 2, 2002 to Wnek et al. the membrane may consist of a sulfonated statistical copolymer. As will be appreciated, the construction of the core is essential to the efficient transfer of heat/moisture.

Current plate type ERVs require a complex process to manufacturer since the flow passage is contained by the plane of the membrane above and below it. As highlighted in FIG. 2B, the simplest construction of plate type ERV core 14 consists of fresh and stale air flow streams 16, 18 being isolated by folding the membrane over a corrugate spacer.

Figure 2C:
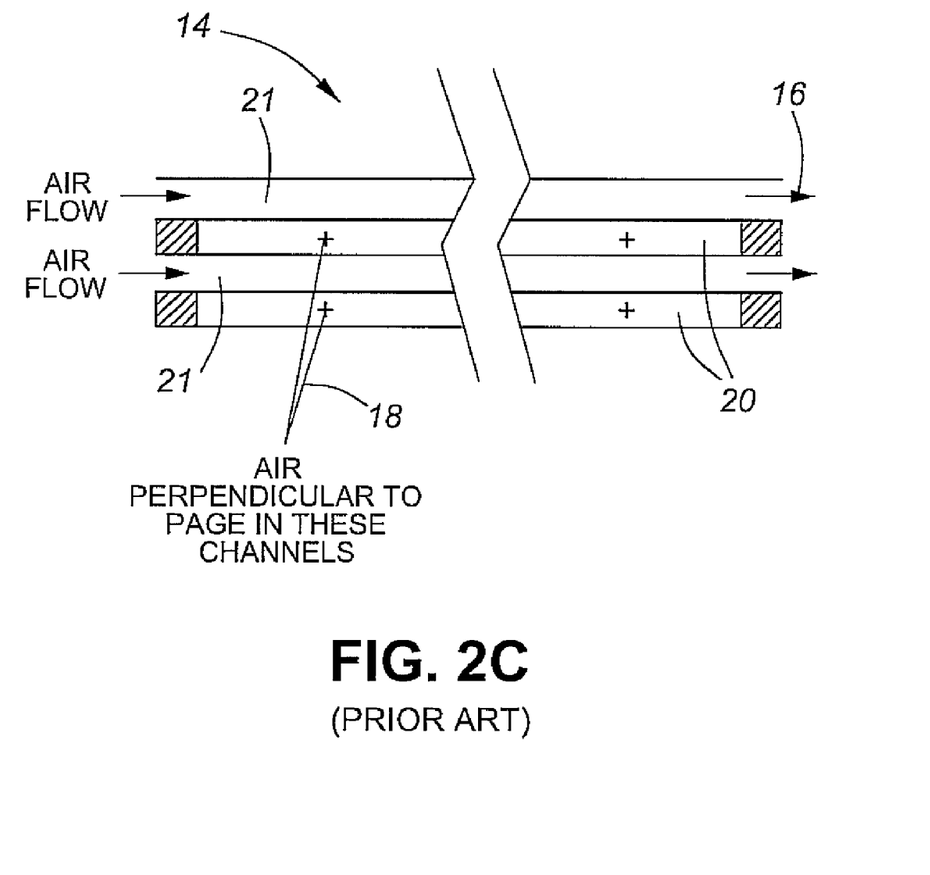
FIG. 2C depicts the stale and fresh air stream flow through the cross flow plate of FIG. 2B.

This is common for cross flow only cores where the flow passages are rectangular as shown in FIG. 2C. Accurate control of adhesives application is required to seal the seams where the edges of the folded membrane meet. In most cases the membrane can be expensive and not very durable. Additionally, the exposed membrane edges are vulnerable to damage from incidental contact. As also shown in FIG. 2C, in a traditional plate type ERV core 14, fresh and stale air flow streams 16, 18 flow straight through flow passages 21 with the exit and entrance conditions being the same. Heat/moisture is transferred through upper and lower membranes 20 from air flow stream 16 to air flow stream 18.

Counter current/co-current cross flow hybrids ERV cores (not shown) have more complex geometries. When the geometry is more complex than simple rectangles wrapping a spacer with membrane is very difficult and inefficient. The membrane must be cut into odd shapes and folded over at odd angles. Some manufacturers of this design extrude the plastic for the spacer elements onto the core as it is being built. This requires computer numerically controlled (CNC) equipment and the ability to extrude plastic at the same time. Further the next membrane layer must be glued onto the spacer. A complex glue application process is required to apply glue only to the spacer without contaminating the membrane.

From a manufacturing standpoint, the core must be easy to assemble to keep production and capitol investment cost low. From an operational standpoint, the materials used in the core must allow moisture exchange but not allow air, which is mainly nitrogen and oxygen, to exchange between air flows 16, 18. As well, the materials must be neither undamaged by contact with water nor allow particulate to be exchanged between air flows 16, 18. From a safety standpoint, the core must meet Underwriters Laboratories UL900 Class 2 for smoke and flame resistance. This standard determines combustibility and the amount of smoke generated for air filter units of both washable and throwaway types used for removal of dust and other airborne particles from air circulated mechanically in equipment and systems installed in accordance with the Standards for Installation of Air Conditioning and Ventilating Systems, NFPA 90A (Other Than Residence Type), and for Installation of Warm Air Heating and Air Conditioning Systems, NFPA 90B (Residence Type). With conventional spacers used to separate stale and fresh air flows, spacer rails normal to the flow direction at the outlet and inlet can melt together. However, this may not serve to completely block the flow of air and thereby limit the spread of fire.

Although the ERV cores presently available are adequate for their intended purpose, a cost-effective ERV core meeting the above criteria is needed.

SUMMARY OF THE INVENTION

Accordingly, it is an object of the invention to provide an improved ERV core which can be easily manufactured, meets the UL900 Class 2 standard and is operationally efficient in terms of heat/moisture transfer while inhibiting air and particulate transfer between air flows.

This object is realized by an ERV cross flow plate core which incorporates a unique spacer design for ease of manufacturing and aid in passing smoke and flame requirements. The unique flat spacer design allows a membrane to be laminated to the spacer to form a wafer. The core is then assembled using a sequence of left and right hand wafers, the left hand spacer being a mirror image of the right hand spacer. The shape and orientation of the left and right hand wafers in the core creates recessed steps at the air stream inlet and outlet. At the inlet, the recessed step directs the air stream flow into an air stream channel formed by the membrane of an upper right hand wafer, the membrane of a lower left hand wafer, and curvilinear rails of the flat spacer in the upper right hand wafer. More specifically, the air stream flow is directed against the membrane of the upper right hand wafer to maximize heat/moisture transfer.

The flat spacers are a low melt polyvinyl chloride which, when exposed to heat, melt together to block air flow thus minimizing flame and smoke, thereby meeting the UL 900 Class 2 standard. The spacer is also rated UL 94-V0 to further minimize smoke and flame spread. With the flat spacer design of the present invention, the recessed inlet and outlet steps (formed by spacer rails) can melt together to restrict air flow, as well as the curvilinear spacer rails which form the channels in the core.

The flat spacer construction of the present invention aids in maintaining the rigidity of the core and protects the membranes from incidental contact. Further, the membrane used in the ERV core of the present invention is much more stable when wet compared to treated paper that is commonly used in membrane based ERVs. Additionally, the membrane does not wash off and is undamaged by water.

Certain exemplary embodiments may provide in an air exchanger a cross flow plate core comprising: a left hand wafer comprising a left hand spacer with a first of a plurality of membranes bonded thereto, the left hand spacer comprising a plurality of parallel curvilinear rails which form channels for receiving a first stream of air; and a right hand wafer comprising a right hand spacer with a second of the plurality of membranes bonded thereto, the right hand spacer comprising a plurality of parallel curvilinear rails which form channels for receiving a second stream of air, wherein the left hand spacer of the left hand wafer is bonded to the top of the membrane of the right hand wafer.

Certain other exemplary embodiments may provide an energy recovery ventilator comprising: a cross flow plate core as described above; an outdoor inlet communicating with an indoor inlet, the cross flow pate core and an intake fan disposed therebetween; and an indoor outlet communicating with an outdoor outlet, the cross flow pate core and an exhaust fan disposed therebetween.

Still certain other exemplary embodiments may provide a method of conditioning air for a building by transferring heat and moisture between a first stream of outside fresh air and a second stream of stale building air, the method comprising the steps of: (a) providing an air exchanger comprising: (i) a cross flow plate core as described above; (ii) an outdoor inlet communicating with an indoor inlet, the cross flow pate core and an intake fan disposed therebetween; and (iii) an indoor outlet communicating with an outdoor outlet, the cross flow pate core and an exhaust disposed therebetween; (b) passing the first stream of outside fresh air through the cross flow plate core via the outdoor inlet and the indoor inlet; and (c) passing the second stream of stale building air through the cross flow plate core via the indoor outlet and outdoor outlet, wherein moisture and/or heat are exchanged between the first stream of outside fresh air and the second stream of stale building air.

Additional objects, features and advantages will be apparent in the written description which follows.

BRIEF DESCRIPTION OF THE DRAWINGS

The invention will now be described in relation to the drawings in which.

DETAILED DESCRIPTION OF THE INVENTION

In general, the invention provides an ERV cross flow plate core which allows two air streams to flow in close proximity to one another and transfer heat/moisture through a membrane separating the two air streams. The ERV core consists of left and right hand flat spacers with membranes laminated thereto to form wafers which are stacked together to form the core.

Figures 3A, 3B:
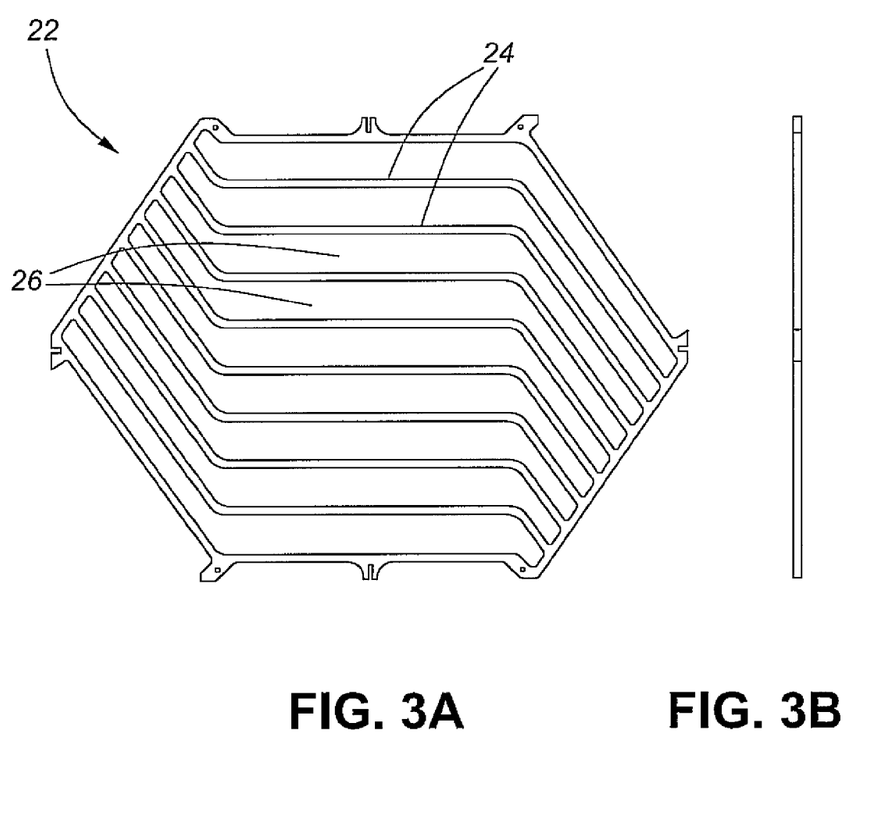
FIG. 3A depicts a top view of a left hand spacer of a cross flow plate core in accordance with the present invention.
FIG. 3B depicts a side view of a left hand spacer of a cross flow plate core in accordance with the present invention.

Referring to FIGS. 3A and 3B, a top and side view respectively of a left hand spacer 22 in accordance with the present invention is depicted. Each left hand spacer 22 is generally hexagonal in shape and includes a series of parallel curvilinear arms 24 to form channels 26, which as will be explained below, serve to direct a first air stream moving through the ERV core. A membrane 34 (see FIG. 5) is bonded to the top of the left hand spacer 22 and trimmed to the shape of left hand spacer 22. The left hand spacer 22 with bonded membrane 34 forms a left hand wafer 35.

Figure 4:
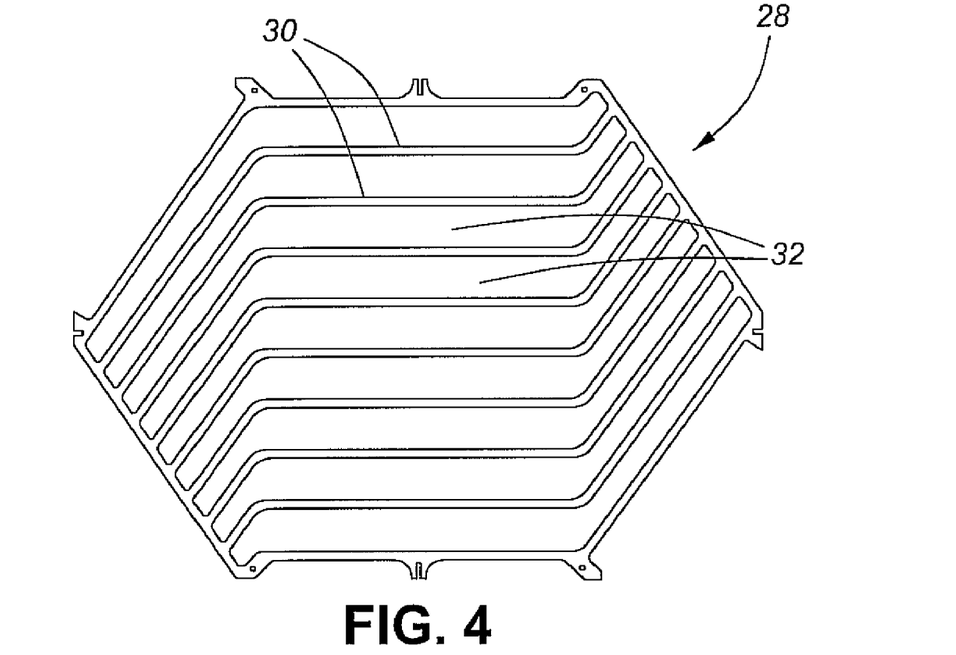
FIG. 4 depicts a top view of a right hand spacer of a cross flow plate core in accordance with the present invention.

FIG. 4 depicts aright hand spacer 28. Similar to left hand spacer 22, each right hand spacer 28 is generally hexagonal in shape and includes a series of parallel curvilinear arms 30 to form channels 32, which as will be explained below, serve to direct a second air streams moving through the ERV core. A membrane 36 (see FIG. 5) is bonded to the top of the right hand spacer 28 and trimmed to the shape of right hand spacer 28. The right hand spacer 28 with bonded membrane 36 forms a right hand wafer 37. Notably, as highlighted most clearly in FIG. 5, left hand wafer 35 is the mirror image of right hand wafer 37.

Figure 5:
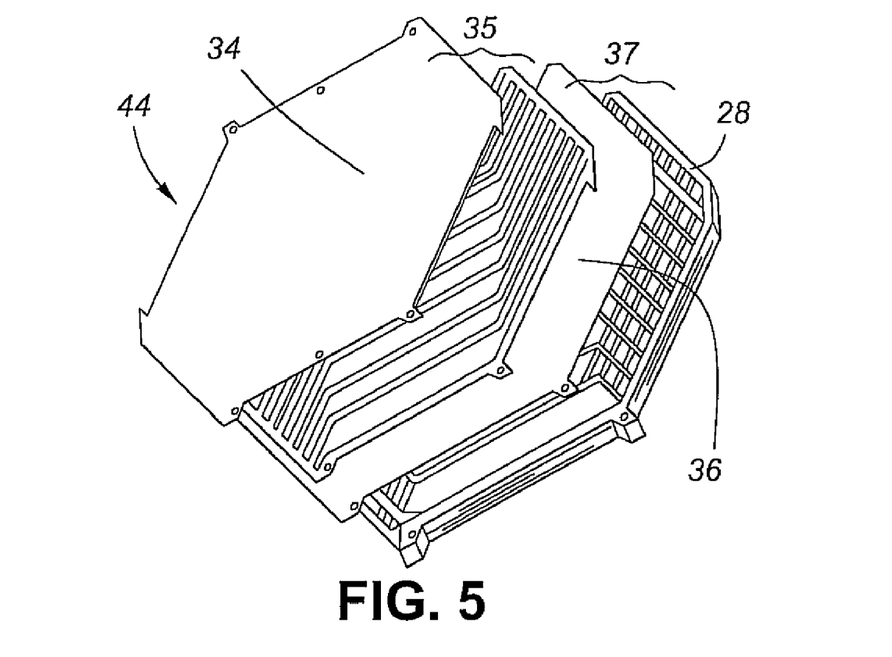
FIG. 5 depicts a perspective exploded view of an assembled cross flow plate core in accordance with the present invention.
Figure 6A:
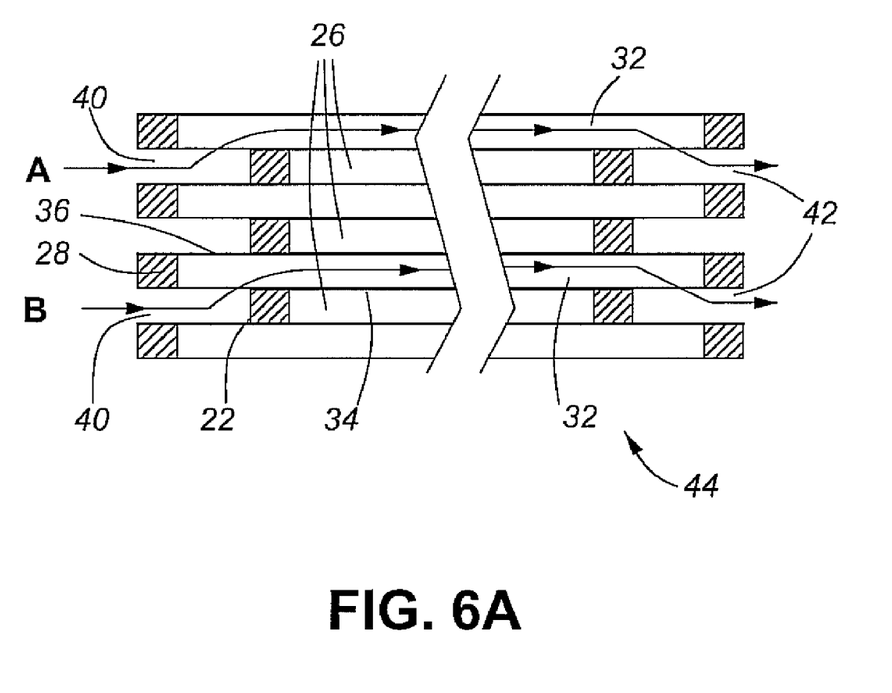
FIG. 6A depicts a side partial cross-sectional view of an assembled cross flow plate core in accordance with the present invention highlighting the air flow through the core.
Figure 6B:
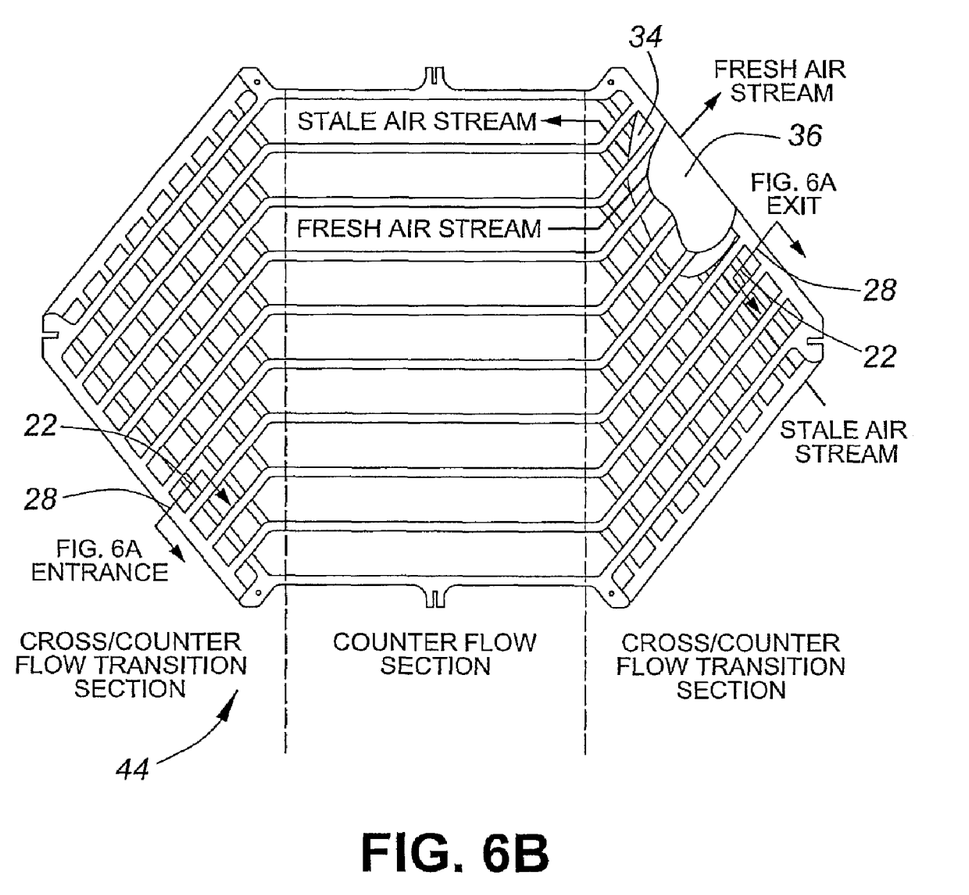
FIG. 6B depicts a top view and of the cross flow plate core in accordance with the present invention highlighting, from a different perspective, the air flow through the core as depicted in FIG. 6A.

Referring to FIGS. 5 and 6, an ERV core 44 is built by bonding alternating left hand wafers 35 and right hand wafers 37 to form a stack. More specifically, as shown the figures, the bottom of a first smaller left hand wafer 35 is bonded to the top of a first larger left hand wafer 37. The bottom of a second larger left hand wafer 37 is bonded to the top of the first smaller right hand wafer 35. This pattern is repeated until a desired core size is achieved. With respect to FIG. 5, it should be noted that the membranes 34, 36 are not shown in the lower portion of ERV core 44 so that the relationship of the channels 26, 32 formed by the parallel curvilinear arms 24, 30 of left and right hand spacers 22, 28 can be more readily understood. More specifically, when left hand wafers 35 and right hand wafers 37 are stacked together the middle portion of channels 26, 32 are parallel to one another, while the ends of channels 26, 28 are offset from one another approximately 90 degrees.

FIGS. 6A and 6B depict the flow of the two streams air entering and exiting ERV core 44 as it would occur in an assembled core. The first of the two air streams (e.g. the fresh air stream) are shown with flow stream lines A, B parallel to the page. It will be appreciated that, although not depicted, the second of two air streams passing through ERV core 44 (e.g. the stale air stream) flows roughly normal to the page and enters channels 26 i.e. as discussed above, the entrance and exit of the fresh air stream, and the entrance and exit of the stale air stream are offset from one another approximately 107 degrees. The fresh air streams enter at stepped recessed areas 40 and exit at stepped recessed areas 42, The fresh air stream flows over left hand wafer 35 and through channels 32 formed by parallel curvilinear arms 30 in right hand spacer 28. The stale air streams flow over right hand wafer 37 and through channels 26 formed by parallel curvilinear arms 24 in left hand spacer 22.

The fresh air entering at A, B flows in channels 32 over membrane 34 bonded to left hand spacer 22 and under membrane 36 bonded to right hand spacer 28. Moisture contained in the air stream diffuses to membranes 34, 36. Moisture then passes through membrane 34, 36 by solid diffusion into the stale air stream flowing in channels 26. Membrane 34, 36 is non porous and does not allow either air or particulate to pass through. As highlighted in FIG. 6B, the approach angle of the fresh air stream is approximately 108° apart from the stale air stream. As also depicted, the fresh and stale air streams essentially pass through three stages in ERV core: a first cross/counter flow transition section; a cross flow section; and a second cross/counter flow transition section. As more clearly shown in FIG. 7, parallel curvilinear arms 24, 30, of left and right hand spacers 22, 28 direct the flow to be counter current (i.e. flow directions are opposed) after the entrance and before the exit.

Figure 7:
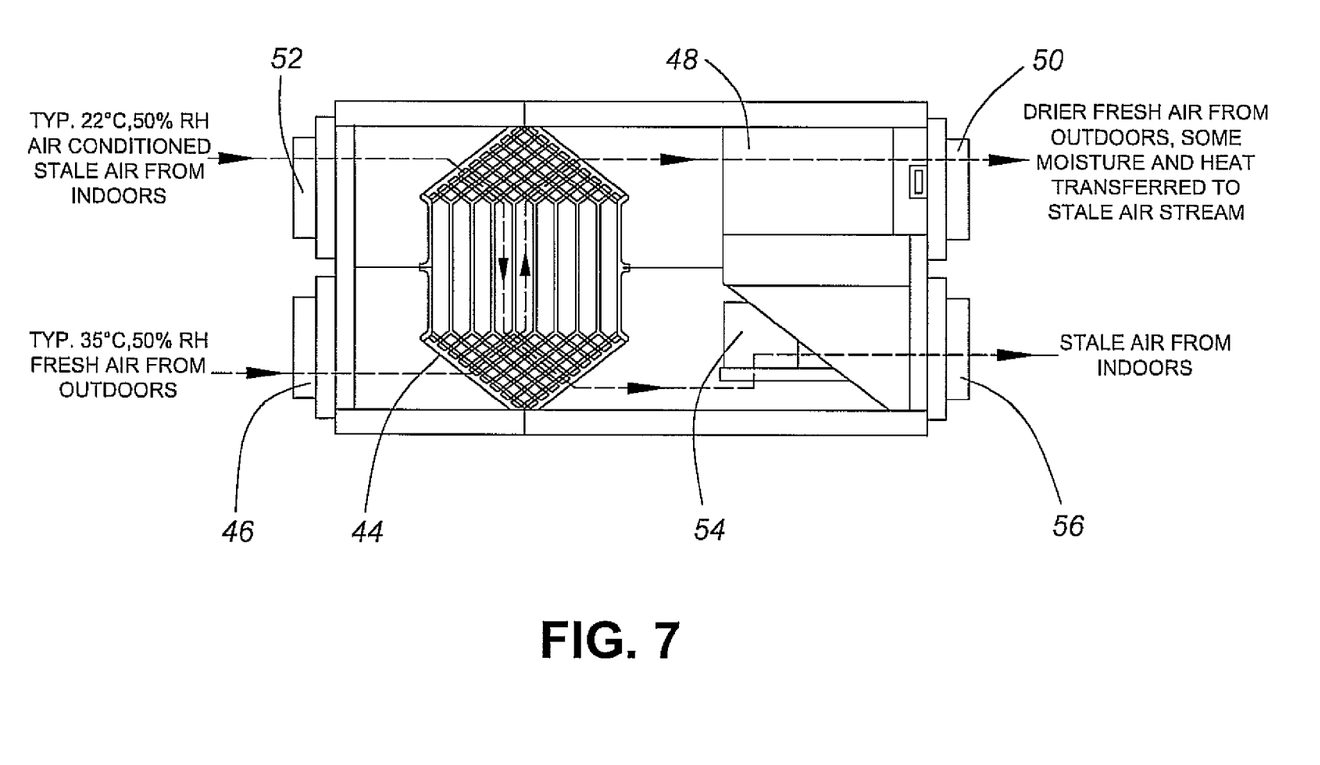
FIG. 7 depicts an ERV with an integral assembled cross flow plate core in accordance with the present invention.

FIG. 7 depicts an air exchanger with an integral assembled ERV core 44 as described above. Fresh air enters at outdoor inlet 46 and passes through the layers of right hand wafers in ERV core 44, then intake fan 48, finally exiting at indoor inlet 50 into the building to be ventilated. Stale, air-conditioned air from the building to be ventilated enters indoor outlet 52 and passes through the layers of left handed wafers in ERV core 44, then exhaust fan 54, finally exiting through outdoor outlet 56. As highlighted in the figure, the fresh air stream is typically tested at 35C and a relative humidity of 50%. The stale air stream normally comprises air conditioned air. In testing, the typical conditions for the stale air stream are 22° C. and 50% relative humidity (RH). As will be appreciated by those in the art, the air exchanger is typically positioned in a mechanical room which is remote from either the area of the building to be ventilated or the outdoors. In such cases, outdoor inlet 46, indoor inlet 50, indoor outlet 52 and outdoor outlet 56 are connected to either to the outdoors or the areas of the building to be ventilated via duct work.

Membrane 34, 36 consists of a non porous hydrophilic membrane and a bonded scrim. Unlike treated paper typically used for this application the membrane is unaffected by water. The chemistry in treated paper can be washed off by water and the paper can become crinkled. With a non porous membrane as in the present invention, there is absolutely no air leakage across membrane 34, 36. Treated paper for ERV core 44 applications typically exhibits some leakage.

The ERV core of the present invention offers several advantages. The main advantage of right and left hand spacers 22, 28 is the ease of manufacturing. Simple adhesive application processes such as roll coating can be used to apply adhesive to right and left hand spacers 22, 28. Since right and left hand spacers 22, 28 are flat, it is easy to press the spacer to membrane 34, 36 to construct wafers and then press the wafers together to construct the ERV core. An added advantage is that by forming right and left hand spacers 22, 28 from a low melt poly-vinyl chloride (PVC), the plastic will droop together sealing flow passage when exposed to excessive heat such as a fire. This helps to limit combustion within the core and meet the UL 900 Class 2 standard. The spacer is also rated UL 94 V-0 to further minimize smoke and flame spread. This standard measures flammability characteristics of polymeric materials to determine a material's tendency either to extinguish or to spread the flame once the specimen has been ignited. There are 12 flame classifications specified in UL 94 that are assigned to materials based on the results of these small-scale flame tests. These classifications are used to distinguish a material's burning characteristics after test specimens have been exposed to a specified test flame under controlled laboratory conditions. Six of the classifications relate to materials commonly used in manufacturing enclosures, structural parts and insulators found in consumer electronic products (e.g. 5VA, 5VB, V-0, V-1, V-2, HB).

The ERV core design of the present invention also helps prevent inadvertent contact with membrane 34, 36. In order for anything to contact membrane 34, 36 it must pass through the width of left and right hand spacer 22, 28. In most other designs the membrane material is folded over to contain the air streams. The amount of exposed material is typically the same as a flow passage for each pass.

While the invention has been shown in a preferred embodiment, it will be understood by those in the art that it is susceptible to various changes and modifications without departing from the spirit thereof. For example, if the pressure gradient between the stale and fresh air flows is low, a microporous material could be used as membrane 34, 36. Microporous membranes typically have higher moisture transfer rates so would be effective in such an environment.

Additionally, the invention may be applied to a fuel cell. A fuel cell consists of a membrane electrode assembly (MEA), which is placed between two flow-field plates. The MBA consists of two electrodes, the anode and the cathode, which are each coated on one side with a thin catalyst layer and separated by a proton exchange membrane (PEM). The flow-field plates direct hydrogen to the anode and oxygen (from air) to the cathode. When hydrogen reaches the catalyst layer, it separates into protons (hydrogen ions) and electrons. The free electrons, produced at the anode, are conducted in the form of a usable electric current through the external circuit. At the cathode, oxygen from the air, electrons from the external circuit and protons combine to form water and heat. The ERV core of the present invention could be used to control the flow of hydrogen and air.

We claim:

1. In an air exchanger, a cross flow plate core comprising:
  (a) a left hand wafer comprising a left hand spacer with a first membrane bonded thereto, the left hand spacer comprising a first plurality of parallel curvilinear rails which form channels for receiving a first stream of air;
  (b) a right hand wafer comprising a right hand spacer with a second membrane bonded thereto, the right hand spacer comprising a second plurality of parallel curvilinear rails which form channels for receiving a second stream of air;
  wherein the left hand spacer of the left hand wafer is bonded to the top of the second membrane of the right hand wafer.

2. The cross flow plate core of claim 1, wherein the channels for receiving the first stream of air and the channels for receiving the second stream of air are offset from one another.

3. The cross flow plate core of claim 2, wherein each of the first and second membranes comprise a non porous hydrophilic membrane and a bonded scrim.

4. The cross flow plate core of claim 3, wherein the left hand wafer is the mirror image of the right hand wafer and the left hand wafer is bonded to the second membrane of the right hand wafer.

5. The cross flow plate core of claim 4, wherein a plurality of bonded left and right hand wafers are stacked to form the core.

6. The cross flow plate core of claim 5, wherein stepped recesses formed between an upper and a lower right hand wafer and an exterior perimeter wall of the left hand wafer lying therebetween, allow the first stream of air to enter and exit a selected one of the recesses, after passing over the first membrane of the left hand wafer and under the second membrane of the upper right hand wafer.

7. The cross flow plate core of claim 6, wherein the left hand spacer and the right hand spacer are formed from low-melt poly-vinyl chloride (PVC).

8. The cross flow plate core of claim 7, wherein, upon being subjected to excessive heat, the parallel curvilinear rails of each of the left hand spacers and the right hand spacers melt together to limit combustion within the core.

9. The cross flow plate core of claim 7, wherein each of the left hand wafer and the right hand wafer are generally hexagonal in shape, and wherein, when the left hand spacer of the left hand wafer is bonded to the top of the second membrane of the right hand wafer, a middle portion of the channels formed in the left and right handed wafers are parallel to one another to create a counter flow section, and end portions of the channels formed in the left hand wafer are offset from end portions of the channels formed in the right hand wafer by approximately 107 degrees.

10. The cross flow plate core of claim 7, wherein the polyvinyl chloride (PVC) is UL 900 Class2 and UL 94 V-0 compliant.

11. The cross flow plate core of claim 1, wherein the first membrane is bonded to the left hand spacer and the second membrane is bonded to the right hand spacer by roll coating an adhesive on the left and right hand spacers and pressing the first and second membranes to the left and right hand spacers respectively.

12. An energy recovery ventilator comprising:
  (a) a cross flow plate core as claimed in claim 1:
  (b) an outdoor inlet communicating with an indoor inlet, the cross flow pate core and an intake fan disposed therebetween; and
  (c) an indoor outlet communicating with an outdoor outlet, the cross flow pate core and an exhaust fan disposed therebetween.

* * * * *